(12) United States Patent
Ueki et al.

(10) Patent No.: US 7,694,106 B2
(45) Date of Patent: Apr. 6, 2010

(54) MULTIPROCESSOR SYSTEM

(75) Inventors: Toshikazu Ueki, Kawasaki (JP);
Takaharu Ishizuka, Kawasaki (JP);
Makoto Hataida, Kawasaki (JP);
Takashi Yamamoto, Kawasaki (JP);
Yuka Hosokawa, Kawasaki (JP);
Takeshi Owaki, Kawasaki (JP); Daisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 11/785,891

(22) Filed: Apr. 20, 2007

(65) Prior Publication Data

US 2008/0046694 A1    Feb. 21, 2008

(30) Foreign Application Priority Data

Aug. 17, 2006  (JP)  ............................. 2006-222286

(51) Int. Cl.
*G06F 9/00*   (2006.01)

(52) U.S. Cl. ........................................................ 712/10

(58) Field of Classification Search ........................ None
See application file for complete search history.

(56) References Cited

U.S. PATENT DOCUMENTS

| 5,657,472 | A | * | 8/1997 | Van Loo et al. ............. 711/158 |
| 5,870,572 | A | * | 2/1999 | Garcia ........................ 710/310 |
| 6,081,874 | A | * | 6/2000 | Carpenter et al. ........... 711/141 |
| 6,092,155 | A | | 7/2000 | Olnowich |
| 6,263,405 | B1 | * | 7/2001 | Irie et al. ..................... 711/141 |
| 6,912,612 | B2 | * | 6/2005 | Kapur et al. ................. 710/309 |
| 6,938,128 | B1 | * | 8/2005 | Kuskin et al. ............... 711/141 |
| 2005/0160430 | A1 | * | 7/2005 | Steely et al. ................. 719/310 |
| 2005/0216677 | A1 | * | 9/2005 | Jeddeloh et al. ............. 711/150 |

FOREIGN PATENT DOCUMENTS

JP    2001-184321    7/2001

OTHER PUBLICATIONS

Extended European Search Report, mailed Dec. 4, 2007 and issued in corresponding European Patent Application No. 07107000.7-1229.

* cited by examiner

*Primary Examiner*—Eric Coleman
(74) *Attorney, Agent, or Firm*—Staas & Halsey LLP (57) ABSTRACT

A multiprocessor system includes a judging unit judging whether a read command inputted to a global address crossbar is a read command to a memory on an own system board, an executing unit speculatively executing, when the judging unit judges that the read command is a read command to the memory on the own system board, the read command before global access based on an address notified from the global address crossbar, a setting unit setting for queuing data read from the memory in a data queue provided on a CPU without queuing the data in a data queue provided on the memory, and an instructing unit instructing, based on notification from the global address crossbar, the data queue provided on the CPU to discard the data or transmit the data to the CPU.

10 Claims, 10 Drawing Sheets

MULTIPROCESSOR SYSTEM

CROSS-REFERENCE TO RELATED APPLICATIONS

This application claims the conventional priority based on Japanese Patent application No. 2006-222286, filed on Aug. 17, 2006, the disclosures of which are incorporated herein by reference.

BACKGROUND OF THE INVENTION

1. Field of the Invention

This present invention relates to a multiprocessor system having a plurality of system boards connected with each other via a global address crossbar and including CPU and memory, and symmetrically assigning processing to all the CPUs by inputting addresses to the global address crossbar. More particularly, the present invention relates to a multiprocessor system that realizes reduction in latency of read from a memory.

2. Description of the Related Art

Figure 9:
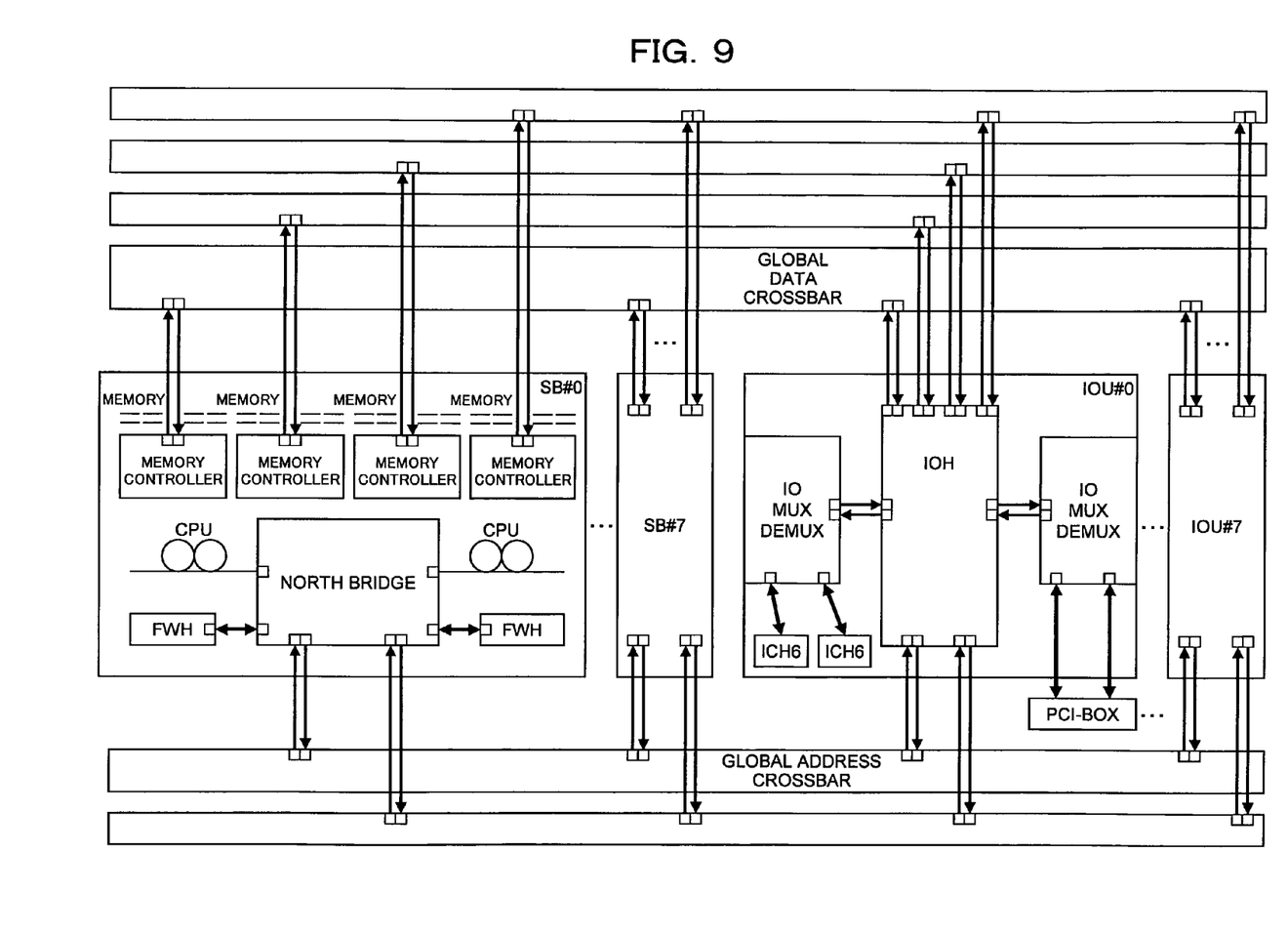
FIG. 9 is a diagram for explaining a symmetric multiprocessor.

A symmetric multiprocessor (SMP) has, as shown in FIG. 9, a plurality of system boards (SBs) each of which includes a CPU and a memory, and a plurality of IO units (IOUs) connected with the SBs via a global address crossbar and a global data crossbar. The symmetric multiprocessor adopts a parallel processing system having a characteristic that processing is symmetrically and equally assigned to all the CPUs.

When a CPU requests data, the symmetric multiprocessor collects information (information to be an object of local cast described later) using the global address crossbar. The information includes information on in which memory the data is present, in a cache of which CPU the data is present, whether the data on the cache of the CPU is rewritten by the CPU, whether resources (queue and so on) necessary in transmitting the data to the CPU at the request source are exhausted, whether the data is to be rewritten by a preceding command, and whether accesses to the data compete against each other. The symmetric multiprocessor indicates, based on the information, what kind of processing is applied to the respective system boards to perform processing for allowing the CPU at the data request source to acquire the requested data.

A multiprocessor system including the SMP inputs addresses of data requested by the respective CPUs to the global address crossbar and arbitrates the addresses using the global address crossbar to determine a system board that processes the data at the addresses. The multiprocessor system notifies the respective system boards of a result of the determination to symmetrically and equally assign processing to all the CPUs.

Memory read processing executed in each of the plurality of system boards included in the SMP will be explained with reference to FIG. 10.

When a CPU 1 issues a read request designating an address of data present in a memory 2, the address is inputted to a global address crossbar 8 via a master address queue 4. The address is notified to a pipeline 3 included in each of the plurality of system boards from the global address crossbar 8 as a snoop address. Therefore, the address issued by the CPU 1 is returned to the pipeline 3 having the system board mounted with the CPU 1 at the read request source.

In response to the notification, the pipeline 3 including the system board having the CPU 1 at the read request source speculatively executes a read command designating the snoop address notified from the global address crossbar 8 as a memory read address.

In response to the speculative execution of the read command, the memory read address is queued in a slave memory read address queue 5. According to the queuing, data is read from the memory 2. The data is queued in a slave memory read data queue 6 and waits for an instruction from the pipeline 3.

On the other hand, the pipeline 3 included in the system board having the CPU 1 at the read request source collects, following the speculative execution of the read command, the information described above to be an object of local cast and local-casts the information to the global address crossbar 8.

In response to the local cast, the global address crossbar 8 collects the information described above from each of the system boards. The global address crossbar 8 performs check such as a CPU cache check, an address busy check, and a resource exhaustion check in the system as a whole to determine whether the speculative execution of the read command performed by the pipeline 3 included in the system board having the CPU 1 at the data request source is to be adopted and whether it is necessary to retry the read command. The global address crossbar 8 global-casts a result of the determination to the pipelines 3 included in all the system boards.

In response to the global cast, the pipeline 3 included in the system board having the CPU 1 at the data request source instructs, based on the notification from the global address crossbar 8, the slave memory read data queue 6 to transmit the queued data to the CPU 1 to cause the slave memory read data queue 6 to queue the data to a master read data queue 7. The pipeline 3 also instructs the salve memory read data queue 6 to discard the data queued. Moreover, in instructing the slave memory read data queue 6 to discard the data, the pipeline 3 instructs the master address queue 4 to retry the read command.

In this way, the multiprocessor system including the SMP inputs addresses of data requested by the respective CPUs to the global address crossbar and arbitrates the addresses using the global address crossbar to determine a system board that processes the data at the addresses. The multiprocessor system notifies a result of the determination to the respective system boards to symmetrically and uniformly assign processing to all the CPUs.

In the present invention, as explained below, the multiprocessor system including the SMP realizes reduction in latency of read from a memory to realize improvement of processing performance of the system. As a conventional technique related to the present invention, there is, for example, an invention described in Japanese Patent Application Laid-Open No. 2001-184321.

In a system including a CPU having a large-scale cache, latency of read from a memory substantially affects processing performance of the system. When latency is short, processing performance of the system is improved.

The multiprocessor system including the SMP has a characteristic that it is possible to read data from a memory from respective nodes with equal latency. However, latency at the time of read from a memory physically close to the multiprocessor system is worse than that in a small-sized multiprocessor system of a non-SMP structure.

According to optimization of a program, a CPU of each of the nodes is capable of preferentially using a memory of the own node. However, this advantage is not obtained in a large-scale multiprocessor system of an SMP structure.

Therefore, in the multiprocessor system including the SMP, it can be expected that processing performance of the system is improved simply by reducing latency of read from the memory of the own node.

In order to realize reduction in latency of read from a memory, it is important to reduce latency of respective modules. It is also possible to realize the reduction in latency by reducing a queuing time of processing. This is because, when there is queuing of processing, latency of the entire system is determined by longer latency.

A queuing time caused by memory read processing executed by each of the system boards included in the SMP will be explained with reference to FIG. 10.

Figure 10:
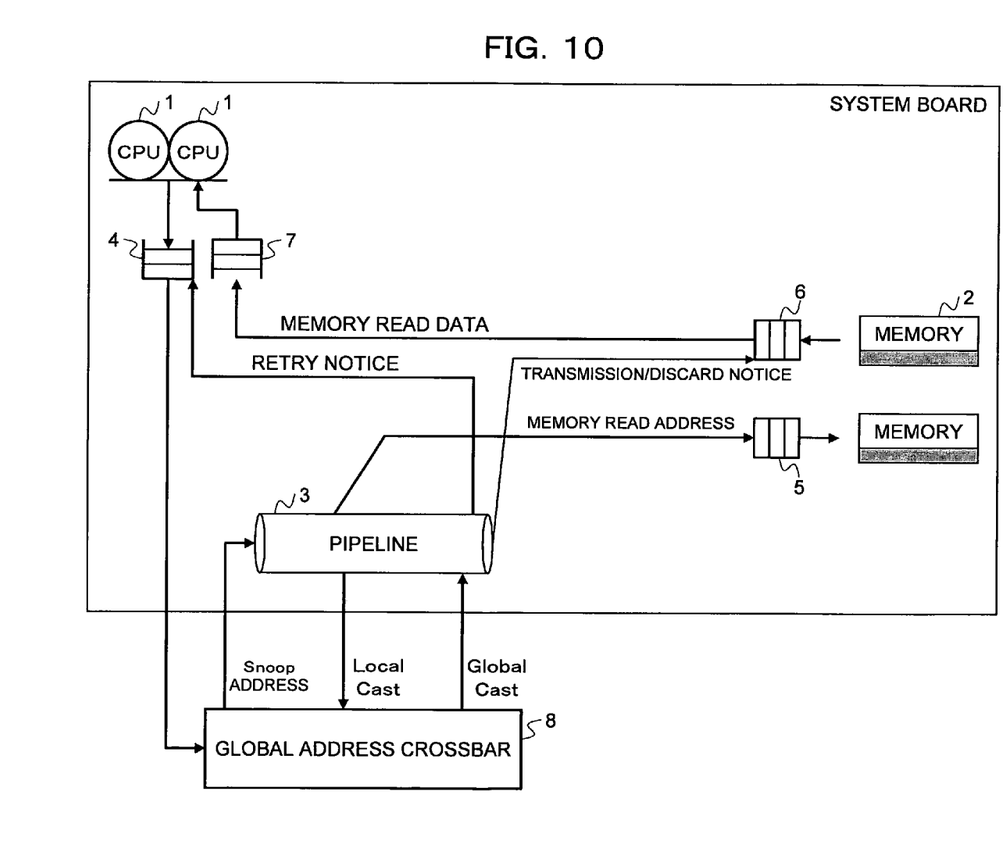
FIG. 10 is a diagram for explaining memory read processing executed by the symmetric multiprocessor.

In the memory read processing, as shown in FIG. 10, the slave memory read data queue 6 performs processing for queuing read-out of data from the memory 2 and adoption/non-adoption notification for speculative execution of a read command from the pipeline 3 (notification indicating whether data is transmitted or discarded).

In this case, when a delay due to latency of a global address based on processing of the global address crossbar 8 is large, memory data arrives at the slave memory read data queue 6 earlier. The adoption/non-adoption notification of speculative execution of the read command arrives at the slave memory read data queue 6 later. Conversely, when a delay due to data read latency of the memory 2 is large, the adoption/non-adoption notification of speculative execution of the read command arrives at the slave memory read data queue 6 earlier. The memory data arrives at the slave memory data queue 6 later.

As it is seen from the above, in the conventional technique, in the memory read processing executed by each of the system board included in the SMP, a queuing time is inevitably caused in the slave memory read data queue 6. Therefore, there is a problem in that it is impossible to improve processing performance of the system.

SUMMARY OF THE INVENTION

It is an object of the present invention to provide a multiprocessor system that realizes reduction in latency of memory read in a local node by reducing a queuing time of data and an address caused in memory read processing executed by each of system boards included in an SMP.

The multiprocessor system of the present invention is the multiprocessor system having a plurality of system boards connected with each other via a global address crossbar and including a CPU and a memory in each of the plurality of system boards, and symmetrically assigning processing to all the CPUs by inputting addresses to the global address crossbar. The multiprocessor system comprises a judging unit judging whether a read command issued from a CPU, which is to be inputted to the global address crossbar, is a read command to a memory on an own system board, and an executing unit speculatively executing, in a case that the judging unit judges that the read command is a read command to the memory on the own system board, the read command before global access based on an address notified from the global address crossbar.

The multiprocessor system of the present invention is the multiprocessor system having a plurality of system boards connected with each other via a global address crossbar and including a CPU and a memory in each of the plurality of system boards, and symmetrically assigning processing to all the CPUs by inputting addresses to the global address crossbar. The multiprocessor system comprises a setting unit setting for queuing data read from a memory in a data queue provided on a CPU without queuing the data in a data queue provided on the memory, and an instructing unit instructing, based on notification from the global address crossbar, the data queue provided on the CPU to discard the data or transmit the data to the CPU.

The multiprocessor system of the present invention is the multiprocessor system having a plurality of system boards connected with each other via a global address crossbar and including a CPU and a memory in each of the plurality of system boards, and symmetrically assigning processing to all the CPUs by inputting addresses to the global address crossbar. The multiprocessor system comprises a judging unit judging whether a read command issued from a CPU, which is to be inputted to the global address crossbar, is a read command to a memory on an own system board, an executing unit speculatively executing, in a case that the judging unit judges that the read command is a read command to the memory on the own system board, the read command before global access based on an address notified from the global address crossbar, a setting unit setting for queuing data read from the memory in a data queue provided on the CPU without queuing the data in a data queue provided on the memory, and an instructing unit instructing, based on the notification from the global address crossbar, the data queue provided on the CPU to discard the data or transmit the data to the CPU.

According to the present invention, it is possible to reduce a queuing time of data and an address caused in memory read processing executed by each of the system boards included in the SMP without destroying the basic processing of the SMP.

Therefore, according to the present invention, in the multiprocessor system including the SMP, it is possible to realize reduction in latency of memory read in a local node without destroying the basis processing of the SMP.

DETAILED DESCRIPTION OF THE PREFERRED EMBODIMENTS

Hereinafter, the outline of the present invention is described. The multiprocessor system of the present invention is the multiprocessor system having a plurality of system boards connected with each other via a global address crossbar and including (at least) a CPU and a memory in each of the plurality of system boards, and symmetrically assigning processing to all the CPUs by inputting addresses to the global address crossbar. The multiprocessor system includes (1) a judging unit judging whether a read command issued from a CPU, which is to be inputted to the global address crossbar, is a read command to a memory on an own system board, (2) an executing unit speculatively executing, when the judging unit judges that the read command is a read command to the memory on the own system board, the read command before global access based on an address notified from the global address crossbar, (3) a setting unit setting for queuing data read from a memory in a data queue provided on a CPU without queuing the data in a data queue provided on the memory, and (4) an instructing unit instructing, based on notification from the global address crossbar, the data queue provided on the CPU to discard the data or transmit the data to the CPU.

The multiprocessor system may further include (5) a first temporary stop unit temporarily stopping the speculative execution of the read command executed by the executing unit when a bus connecting the data queue provided on the memory and the data queue provided on the CPU is in a busy state, (6) a canceling unit temporarily canceling the setting by the setting unit to perform setting for queuing the data read from the memory in the data queue provided on the memory when the bus connecting the data queue provided on the memory and the data queue provided on the CPU is in a busy state, (7) a temporary stop unit temporarily stopping, when retry for speculative execution of a read command is frequently performed, the speculative execution of the read command, and (8) a stopping unit stopping, when number of retries for speculative execution of a read command exceeds the specified number of times, the speculative execution of the read command.

In the multiprocessor system of the present invention comprised as described above, when the CPU issues a read command, the judging unit judges whether the read command is a read command to a memory on an own system board. When the judging unit judges that the read command is a read command to the memory on the own system board, the executing unit speculatively executes the read command before global access based on an address notified from the global address crossbar.

When data in the memory is rewritten by the CPU, considering failure of the speculative execution, the judging unit may judge whether the read command issued from the CPU is a read command to the memory on the own system board with a specific read command such as a read command with a high probability of presence of a requested data in the memory (for example, a read command not to be rewritten by the CPU) set as an object of judgment to improve a probability of success in the speculative execution.

Figure 1:
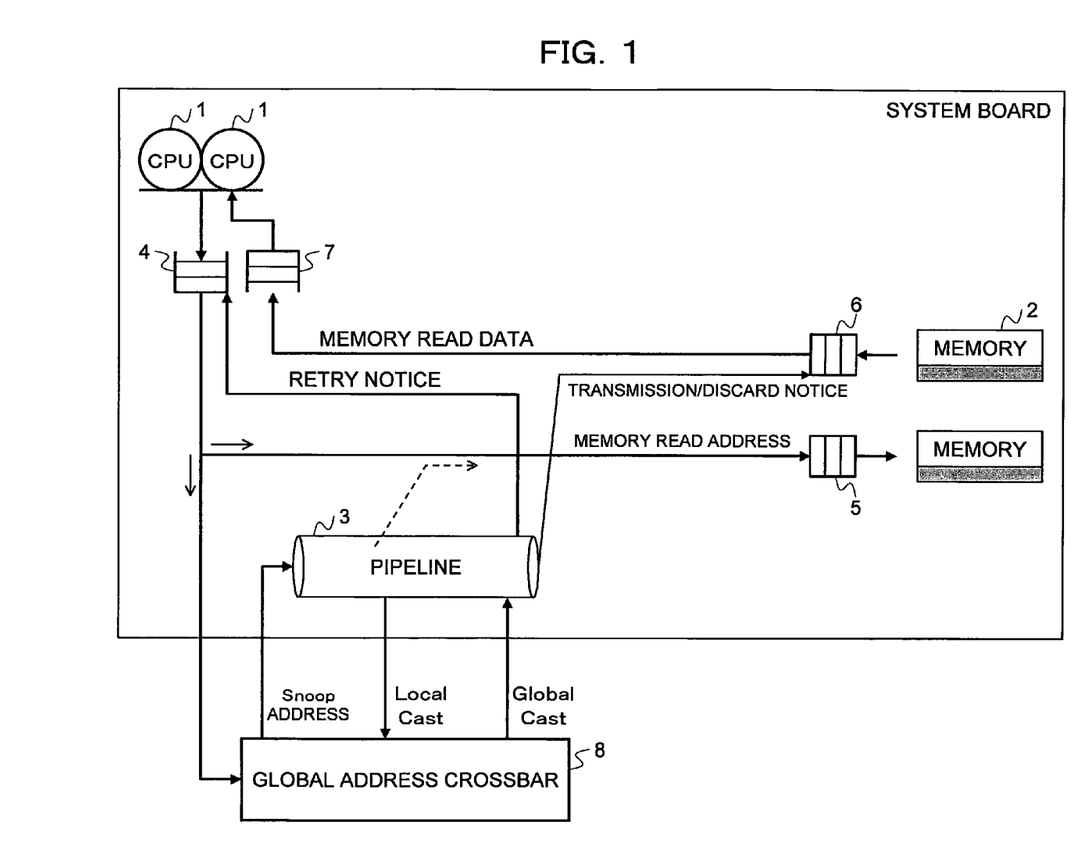
FIGS. 1 and 2 are diagrams for explaining memory read processing executed according to an embodiment of the present invention.

In this way, in the multiprocessor system of the present invention, when a read command issued by the CPU is a read command to the memory on the own system board, as shown in FIG. 1, the read command is speculatively executed before global access based on an address notified from the global address crossbar.

According to above described structure of the present invention, the other system board speculatively execute read commands based on addresses notified from the global address crossbar. Thus, the basic structure of the SMP is not destroyed in the multiprocessor system of the present invention.

In the multiprocessor system of the present invention, for example, when the executing unit performs speculative execution of a read command characteristic in the present invention, the setting unit sets for queuing data read from the memory in the data queue provided on the CPU without queuing the data in the data queue provided on the memory. Thus, according to the setting, the instructing unit instructs, based on notification from the global address crossbar, the data queue provided on the CPU to discard the data or transmit the data to the CPU.

Figure 2:
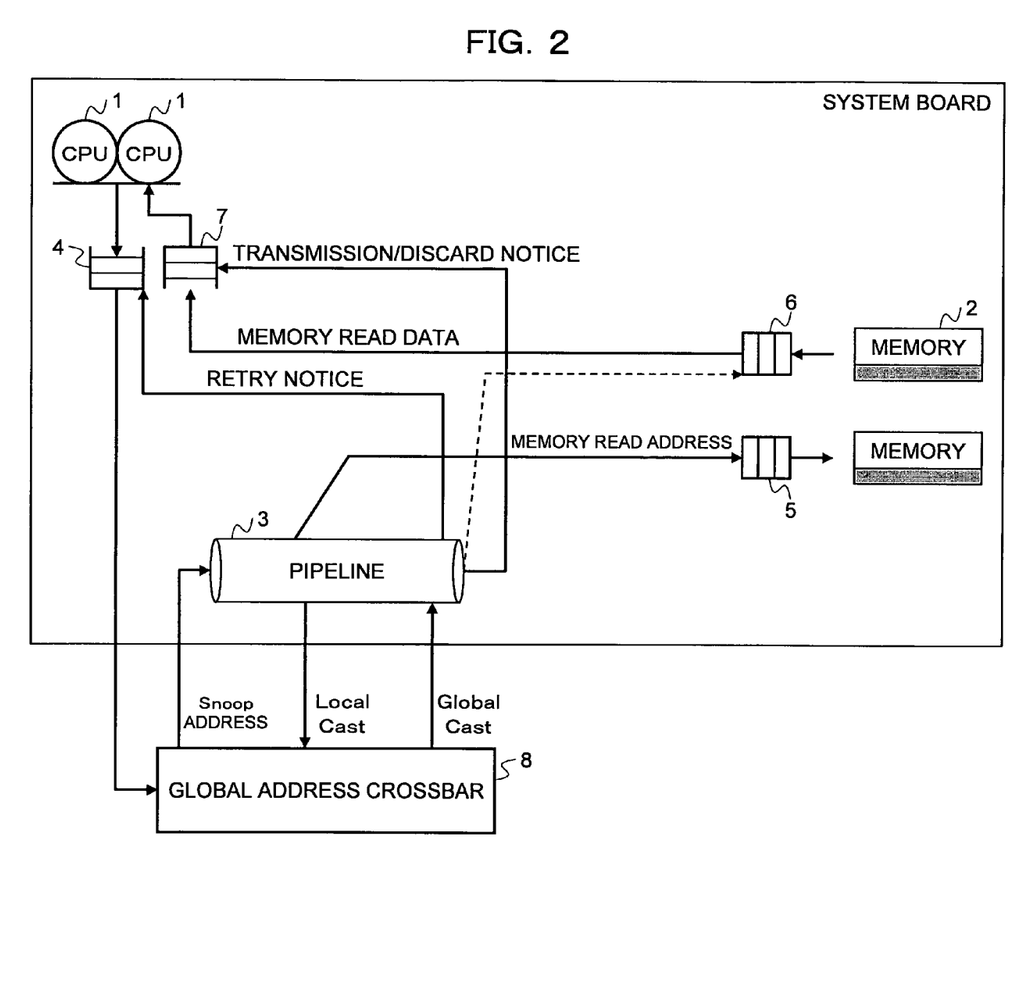

In this way, in the multiprocessor system of the present invention, as shown in FIG. 2, the instructing unit instructs, based on notification from the global address crossbar, the data queue provided on the CPU (the master read data queue 7 shown in FIG. 2) to discard the data or transmit the data to the CPU.

In the multiprocessor system of the present invention, as shown in FIG. 1, when the read command issued by the CPU is a read command to the memory on the own system board, the read command is speculatively executed before global access based on an address notified from the global address crossbar. Therefore, it is possible to read data from the memory at high speed.

However, at this point, when the instruction from the global address crossbar (the instruction to discard the data or the instruction to transmit the data to the CPU) delays, a queuing time of the data read from the memory is extended.

Thus, in the multiprocessor system of the present invention, when such speculative execution of the read command is performed, as shown in FIG. 2, the data read from the memory is queued in the data queue provided on the CPU (the master read data queue 7 shown in FIG. 2) rather than being queued in the data queue provided on the memory (the slave memory read data queue 6 shown in FIG. 2). The multiprocessor system instructs the data queue provided on the CPU to discard the data or transmit the data to the CPU.

According to the above described structure of the present invention, the multiprocessor system of the present invention can read data from the memory at high speed and immediately transmit the data to the CPU.

On the other hand, although not shown in FIG. 2, data is transferred to the bus connecting the slave memory read data queue 6 and the master read data queue 7 from the other system boards.

Therefore, when the data read from the memory is queued in the data queue provided on the CPU rather than being queued in the data queue provided on the memory, the bus connecting the data queue provided on the memory and the data queue provided on the CPU comes into a busy state.

Thus, preferably, the multiprocessor system of the present invention includes the first temporary stop unit to queue the data read from the memory in the data queue provided on the CPU. The multiprocessor system monitors whether the bus connecting the data queue provided on the memory and the data queue provided on the CPU comes into a busy state. When the multiprocessor system detects that the bus comes into a busy state, the multiprocessor system temporarily stops the speculative execution of the read command executed by the executing unit using the first temporary stop unit.

Preferably, the multiprocessor system of the present invention includes the canceling unit to queue the data read from the memory in the data queue provided on the CPU. The multiprocessor system monitors whether the bus connecting the data queue provided on the memory and the data queue provided on the CPU comes into a busy state. When the multiprocessor system detects that the bus comes into a busy state, the multiprocessor system temporarily cancels the setting by the setting unit using the canceling unit to perform setting for queuing the data read from the memory in the data queue provided on the memory.

When retry for the speculative execution of a read command executed by the executing unit is frequently performed, there is a reason of such frequent retry, for example, data is frequency rewritten by the CPU.

Thus, preferably, the multiprocessor system of the present invention includes the second temporary stop unit. When retry for the speculative execution of a read command executed by the executing unit is frequency performed, the multiprocessor system temporarily stops the speculative execution of the read command executed by the executing unit using the second temporary stop unit.

When number of retries for speculative execution of a read command executed by the executing unit exceeds a defined number of times, there is a reason for the number of retries exceeding the defined number of times, for example, data is frequently rewritten by the CPU.

Thus, preferably, the multiprocessor system of the present invention includes the stopping unit. When number of retries for the speculative execution of a read command executed by the executing unit exceeds the defined number of times, the multiprocessor system stops the speculative execution of the read command using the stopping unit.

Hereinafter, the present invention will be explained in detail according to an embodiment.

Figure 3:
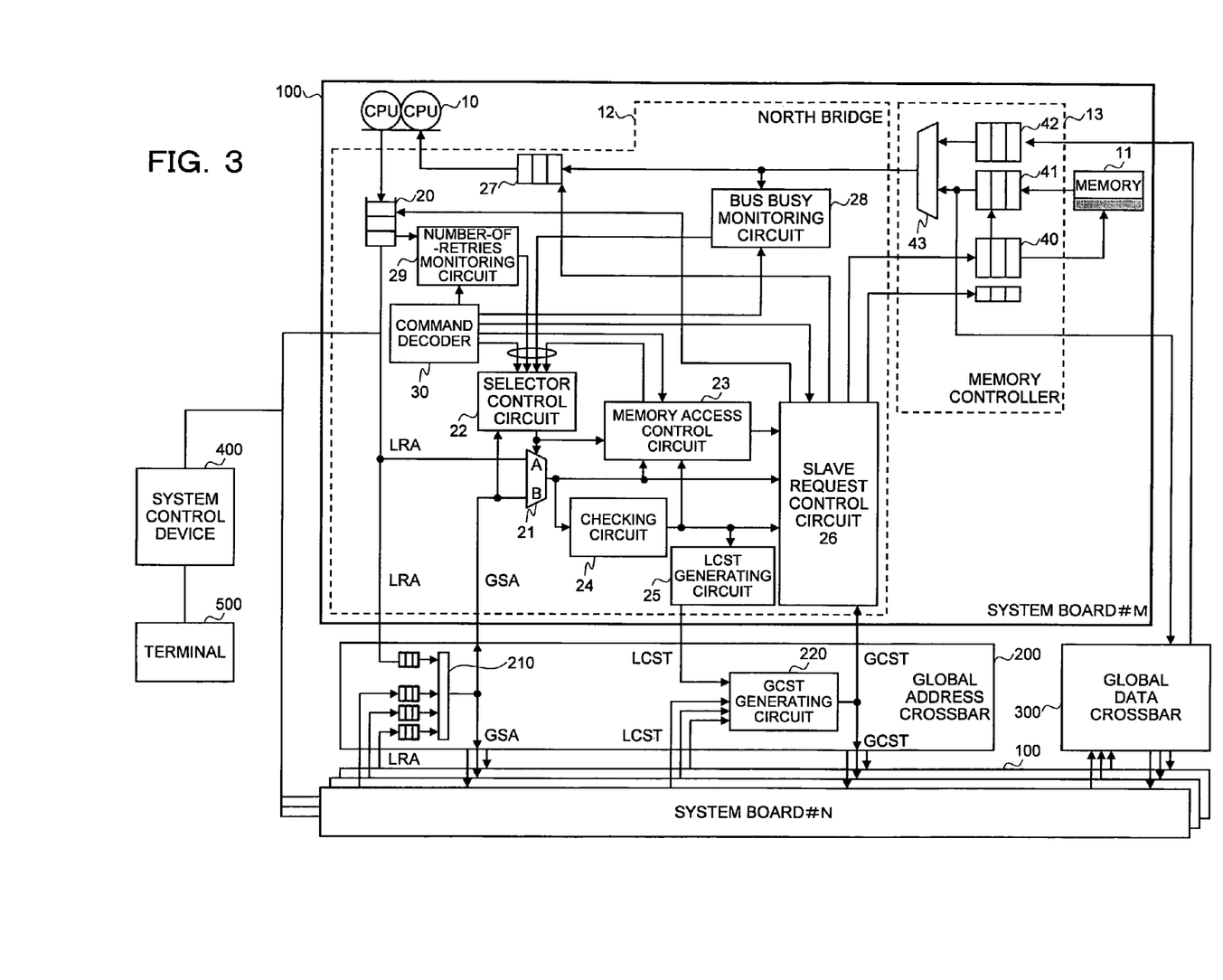
FIG. 3 is a diagram of a multiprocessor system according to the embodiment of the present invention.

A multiprocessor system according to an embodiment of the present invention including an SMP is shown in FIG. 3.

As shown in the figure, the multiprocessor system of the embodiment has a plurality of system boards 100 including CPU 10 and memory 11 and connected with each other via a global address crossbar 200 and a global data crossbar 300.

A system control device 400 connected to a terminal 500 for interaction with a system administrator and performs management of the entire system such as setting of a structure of a partition and setting of an operation mode is connected to the multiprocessor system to the embodiment.

Each of the system boards 100 included in the multiprocessor system of the embodiment generates a local request address packet (hereinafter referred to as LRA packet) and inputs the LRA packet to the global address crossbar 200 in response to an address issued by the CPU 10 included in the own board. In response to the input of the LRA packet, the global address crossbar 200 performs arbitration using a global address priority control circuit 210 to select a global select address packet (hereinafter referred to as GSA packet) out of LRA packets inputted by the system boards 100 and broadcasts the GSA packet to all the system boards 100 (which may be system boards 100 in an identical partition).

When a local cast signal (hereinafter referred to as LCST signal) indicating, for example, that necessity of retry and presence of data is transmitted from each of the system boards 100 in response to the broadcast of the GSA packet, the global address crossbar 200 generates a global cast signal (hereinafter referred to as GCST signal) indicating a retry instruction, adoption or non-adoption of a read command speculatively executed and so on using a GCST generating circuit 220. The global address crossbar 200 broadcasts the GCST signal to all the system boards 100 (which may be system boards 100 in an identical partition).

According to the SMP structure, the multiprocessor system according to the embodiment realizes symmetrical and uniform assignation of processing to all the CPUs 10.

Each of the system boards 100 including in the multiprocessor system of the embodiment includes, in addition to the CPU 10 and the memory 11, a north bridge 12 that connects the CPU 10 and the memory 11 each other and bridges data and a memory controller 13 that controls the memory 11.

The north bridge 12 includes, as shown in FIG. 3, a master address queue 20, a selector 21, a selector control circuit 22, a memory access control circuit 23, an checking circuit 24, an LCST generating circuit 25, a slave request control circuit 26, a master read data queue 27, a bus busy monitoring circuit 28, a number-of-retries monitoring circuit 29, and a command decoder 30.

On the other hand, the memory controller 13 includes, as shown in FIG. 3, a slave memory read address queue 40, a slave memory read data queue 41, an external read data queue 42, and a data transfer circuit 43.

The slave memory read address queue 40 included in the memory controller 13 queues an address of a speculatively executed read command sent from the north bridge 12 and receives a notification of adoption or non-adoption of the speculatively executed read command sent from the north bridge 12. The slave memory read data queue 41 included in the memory controller 13 queues data read from the memory 11 in response to the address queued in the slave memory read address queue 40.

The external read data queue 42 included in the memory controller 13 queues data sent from the other system boards 100. The data transfer circuit 43 included in the memory controller 13 reads out data queued in the slave memory read data queue 41 and the external read data queue 42 and transfers the data to the master read data queue 27 of the north bridge 12.

Functions of the respective circuits included in the north bridge 12 will be explained.

(1) Function of the Master Address Queue 20

The master address queue 20 converts a command from the CPU 10 into an LRA packet of a chip set, holds the LRA packet, and inputs the LRA packet to the global address crossbar 200.

The LRA packet held by the master address queue 20 is, when the LRA packet is a read command, released after data arrives at the CPU 10 and held while the data does not arrive at the CPU 10. When retry is performed in the middle, the LRA packet is inputted again.

The LRA packet includes information such as an operation code, an address, an ID, a board number, number-of-retries information, and partition information.

(2) Function of the Selector 21

The selector 21 selects, according to a selection instruction of the selector control circuit 22, an LRA packet inputted to the global address crossbar 200 or a GSA packet broadcasted from the global address crossbar 200 and outputs the LRA packet or the GSA packet.

(3) Function of the Selector Control Circuit 22

When a GSA packet is broadcasted from the global address crossbar 200 and when the selector control circuit 22 is set in an operation mode for forcibly selecting a GSA packet, the selector control circuit 22 instructs the selector 21 to select a GSA packet. In other cases, the selector control circuit 22 instructs the selector 21 to select an LRA packet.

As the operation mode for forcibly selecting the GSA packet, the GSA packet is set by the system control device 400 and notified via the command decoder 30, the GSA packet is set and notified when frequent retry is detected by the memory access control circuit 23, the GSA packet is set and notified when a bus busy state between the master read data queue 27 and the data transfer circuit 43 is detected by the bus busy monitoring circuit 28, or the GSA packet is set and notified when the LRA packet with a larger number of times of retry is detected by the number-of-retries monitoring circuit 29.

(4) Function of the Memory Access Control Circuit 23

The memory access control circuit 23 controls an access to the memory 11 included in the own system board 100. When the selector 21 selects an LRA packet and the LRA packet is a read access to the memory 11 included in the own system board 100, the memory access control circuit 23 holds address information and ID information held by the LRA packet until a GSA packet corresponding to the LRA packet arrives and holds valid information indicating that the held information is valid. The ID information is held in order to release the LRA packet when the GSA packet arrives.

When the GSA packet is a write packet and an address of the GSA packet matches to an address of the LRA packet held, the memory access control circuit 23 judges overtaking of a write address and sets a retry flag indicating that retry is necessary.

When the retry flag is set, the memory access control circuit 23 returns retry to the global address crossbar 200 with an LCST signal as a response to the GSA packet. The memory access control circuit 23 causes the slave request control circuit 26 to take an action for discarding data according to an instruction of a GCST signal broadcasted from the global address crossbar 200.

When the selector 21 selects an LRA packet and it is detected that the LRA packet is a read command to the memory 11 included in the own system board 100 according to check processing by the checking circuit 24, the memory access control circuit 23 instructs the slave request control circuit 26 to speculatively execute the read command and sets a read command issued flag.

The read command issued at this point is different from a read command based on a usual GSA packet to make it possible to distinguish one from another. When the read command issued flag is set at the time of arrival the GSA packet, since the read command has been issued, the memory access control unit 23 instructs the slave request control circuit 26 not to issue the read command again.

Moreover, the memory access control circuit 23 has a function of monitoring a set ratio of the retry flag and, when frequent retry due to overtaking of a write address or frequent retry instructions from the global address crossbar 200 is detected, setting the selector 21 in an operation mode for forcibly selecting a GSA packet for a fixed period, and notifying the selector control circuit 22 that the selector 21 is set in the operation mode.

The memory access control circuit 23 has a function of, for example, when retry is set, incrementing a set accumulated value by one and, when retry is not set, decrementing the set accumulated value by one, and when the set accumulated value exceeds a specified threshold, setting the selector 21 in the operation mode for forcibly selecting a GSA packet for a fixed period to cause the selector 21 to forcibly select a GSA packet for the fixed period.

(5) Function of the Checking Circuit 24

The checking circuit 24 performs an address map check, a DTAG check, a resource exhaustion check, and an address busy check to check whether data is present in the memory 11 included in the own system board 100, whether data is present in a cache of the CPU 10 included in the own system board 100, and whether it is necessary to instruct retry of a read command because resources necessary for access processing is exhausted or other packets is using an address.

The checking circuit 24 performs the address map check to check whether data indicated by an LRA packet is present in the memory 11 included in the own system board 100.

The checking circuit 24 checks with reference to a DTAG that copies status information recorded in the cache of the CPU 10 and manages the status information to check whether the cache of the CPU 10 included in the own system board 100 has data, whether the cache of the CPU 10 has data matching to data stored in the memory 11, and whether the cache of the CPU 10 has data for rewriting data stored in the memory 11. Consequently, the checking circuit 24 judges from which part the data should be read.

The checking circuit 24 performs the resource exhaustion check for checking whether resources necessary for a read access are exhausted to check whether it is necessary to cancel a read command speculatively executed.

The checking circuit 24 performs the address busy check for checking whether competition of accesses to an identical address occurs to check whether it is necessary to cancel a read command speculatively executed.

When the selector 21 selects an LRA packet, the checking circuit 24 performs only the address map check and only checks whether data is present in the memory 11 included in the own system board 100 to notify the memory access control circuit 23 of a result of the check. Consequently, the checking circuit 24 controls whether speculative execution of a read command is performed.

(6) Function of the LCST Generating Circuit 25

The LCST generating circuit 25 generates, based on a result of check by the checking circuit 24, an LCST signal indicating that retry is necessary and where data is present and inputs the LCST signal to the global address crossbar 200.

(7) Function of the Slave Request Control Circuit 26

The slave request control circuit 26 controls a request to the memory 11 included in the own system board 100.

In a normal case, the slave request control circuit 26 receives a GSA packet broadcasted from the global address crossbar 200 and speculatively executes, based on a result of check by the checking circuit 24 for the GSA packet, a read command on the memory 11 included in the own system board 100 to queue the read command in the slave memory read address queue 40. The slave request control circuit 26 receives a GCST signal broadcasted from the global address crossbar 200 and notifies the slave memory read data queue 41 of adoption or non-adoption of a read command speculatively executed through the slave memory read address queue 40. When the read command speculatively executed is not adopted, the slave request control circuit 26 notifies the master address queue 20 of retry.

On the other hand, in the embodiment, three operation modes are prepared to set which of the operation modes is used in the system control device 40. The operation modes are (a) an operation mode for queuing read data in the slave memory read data queue 41 to notify the slave memory read data queue 41 of adoption or non-adoption of a read command speculatively executed, (b) an operation mode for queuing read data in the master read data queue 27 by transferring the read data to the master read data queue 27 without queuing the read data in the slave memory read data queue 41 to notify the master read data queue 27 of adoption or non-adoption of a read command speculatively executed, and (c) an operation mode for using the latter method for a read command based on an LRA packet and using the former method for a read command based on a GSA packet.

(8) Function of the Master Read Data Queue 27

The master read data queue 27 queues data (in a form of a data packet) transferred from the data transfer circuit 43. The data transferred from the data transfer circuit 43 includes data read out from the slave memory read data queue 41 and data read out from the external read data queue 42. Thus, the master read data queue 27 queues these data.

(9) Function of the Bus Busy Monitoring Circuit 28

The bus busy monitoring circuit 28 counts, with a bus connecting the data transfer circuit 43 and the master read data queue 27 as a monitoring object, the number of data packets transferred to the bus in a fixed period and compares the number with a specified threshold to judge whether the bus comes into a busy state. When the bus busy state is detected, the bus busy monitoring circuit 28 sets the selector 21 in an operation mode for forcibly selecting a GSA packet for a fixed period and notifies the selector control circuit 22 that the selector 21 is set in the operation mode.

(10) Function of the Number-of-Retries Monitoring Circuit 29

In the normal case, the number-of-retries monitoring circuit 29 monitors the number of retries of each of LRA packets. When an LRA packet for which retry is repeated the number of times equal to or larger than a specified number of times is detected, the number-of-retries monitoring circuit 29 controls input of the other LRA packets to make the retry successful.

On the other hand, in the case of the embodiment, considering the likelihood that retry is frequently performed because of the operation of the embodiment, the number-of-retries monitoring circuit 29 performs processing for setting, for an LRA packet for which retry is repeated the number of times equal to or larger than the specified number of times, the selector 21 in an operation mode for forcibly selecting a GSA packet and notifying the selector control circuit 22 that the selector 21 is set in the operation mode.

(11) Function of the Command Decoder 30

The command decoder 30 decodes a command of the system control device 400 to set a board number of each of the system boards 100 and a partition to which the system board 100 belongs and set various operation modes.

The command decoder 30 decodes a command of the system control device 400 to set a threshold of the number of data packets used for judgment of a bus busy state necessary when the bus busy monitoring circuit 28 operates, length of a period in which the selector 21 forcibly selects a GSA packet, and the like.

Operations of the multiprocessor system according to the embodiment comprised as described above will be explained.

In the multiprocessor system of the embodiment, when the CPU 10 issues a read command, the master address queue 20 converts the read command from the CPU 10 into an LRA packet of a chip set, holds the LRA packet, and inputs the LRA packet to the global address crossbar 200.

At this point, the selector 21 selects an LRA packet inputted to the global address crossbar 200 and outputs the LRA packet. In response to the output of the LRA packet, the checking circuit 24 performs the address map check and checks whether data of a read request is present in the memory 11 included in the own system board 100. The selector 21 notifies the memory access control circuit 23 of a result of the check.

In response to the notification, when the memory access control circuit 23 receives a result of check indicating that the LRA packet inputted to the global address crossbar 200 is a read command to the memory 11 included in the own system board 100, the memory access control circuit 23 speculatively executes a read command on the memory controller 13 via the slave request control circuit 26.

In this way, the multiprocessor system of the embodiment performs processing, when it is detected that an LRA packet inputted to the global address crossbar 200 is a read command to the memory 11 included in the own system board 100, to speculatively execute the read command at the timing shown in FIG. 1.

The multiprocessor system of the embodiment inputs, in the same manner as the usual multiprocessor system including the SMP, an LRA packet to the global address crossbar 200. When a GSA packet is broadcasted from the global address crossbar 200 in response to the LRA packet, the multiprocessor system receives the GSA packet and performs the address map check, the DTAG check, the resource exhaustion check, or the address busy check.

At this point, when read request data requested by the CPUs 10 included in the other system boards 100 are present in the memory 11 included in the own system board 100, the multiprocessor system speculatively executes a read command based on the GSA packet. The multiprocessor system generates an LCST signal based on a result of the check and inputs the LCST signal to the global address crossbar 200. When a GCST signal is broadcasted from the global address crossbar 200 in response to the LCST signal, the multiprocessor system receives the GCST signal and judges, based on the GCST signal, adoption or non-adoption of the read command speculatively executed.

On the other hand, in the multiprocessor system of the embodiment, when the read command is speculatively executed based on the LRA packet, data read is transferred to the master read data queue 27 without being queued in the slave memory read data queue 41 and is queued in the master read data queue 27. Adoption or non-adoption of the read command speculatively executed is notified to the master read data queue 27.

According to the above described structure, in the multiprocessor system of the embodiment, data read from the memory 11 according to the read command speculatively executed is transferred to the master read data queue 27 and queued therein.

Therefore, in the multiprocessor system of the embodiment, when it is judged, based on the GCST signal broadcasted from the global address crossbar 200, that the read command speculatively executed is adopted, the master read data queue 27 is instructed to transmit the data read according to the read command speculatively executed to the CPU 10. On the other hand, when it is judged that the read command speculatively executed is not adopted, the master read data queue 27 is instructed to discard the data read according to the read command speculatively executed. The master address queue 20 is instructed to perform retry of an LRA packet for which speculative execution has failed.

In this way, in the multiprocessor system of the embodiment, when it is detected that an LRA packet inputted to the global address crossbar 200 is a read command to the memory 11 included in the own system board 100, processing is performed to queue data read from the memory 11 in a form shown in FIG. 2 to perform processing to notify adoption or non-adoption of the data.

According to the above described structure, in the multiprocessor system of the embodiment, it is possible to read data from the memory 11 at high speed and immediately transmit the data to the CPU 10.

Figure 4:
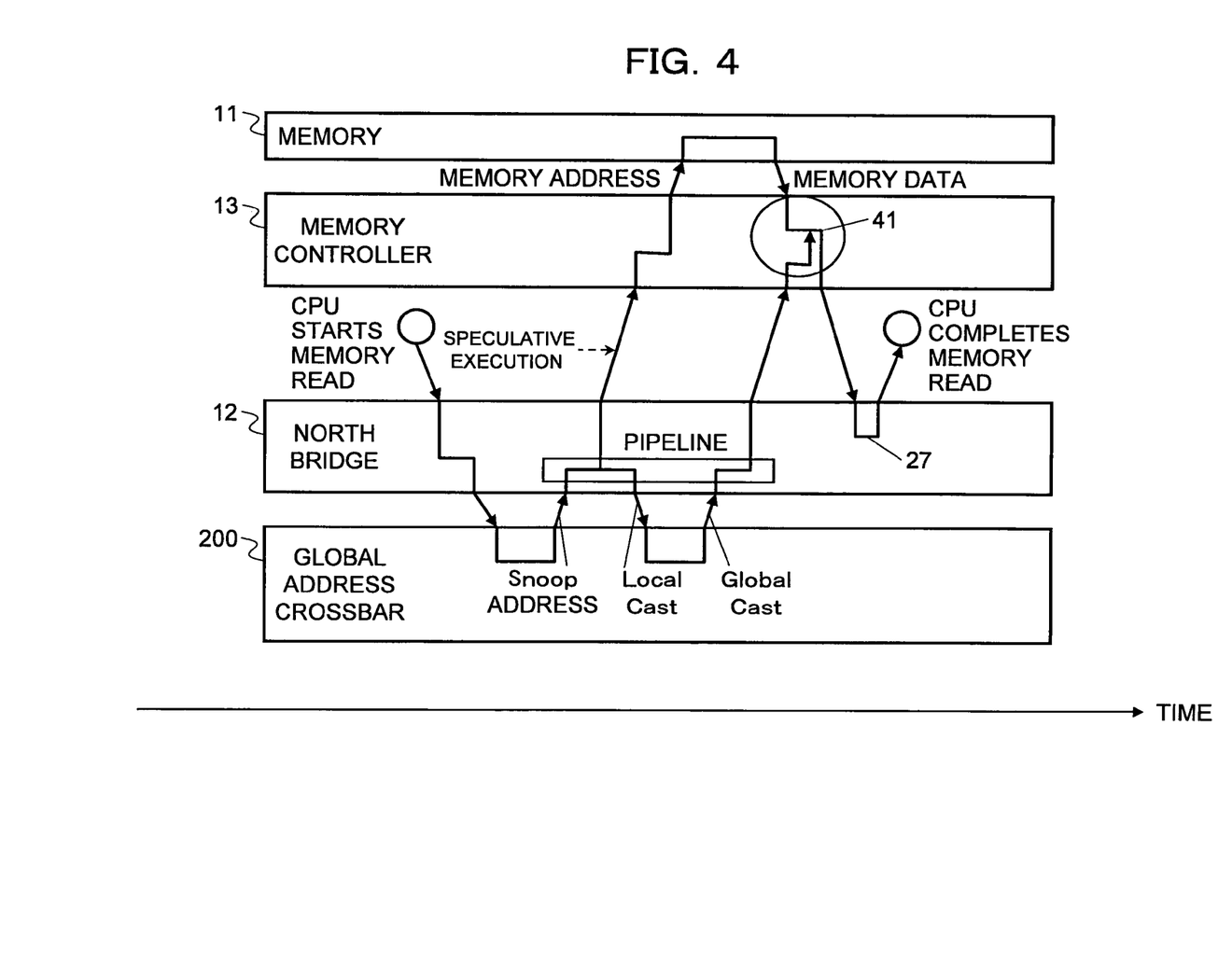
FIG. 4 is a sequence chart of memory read processing executed in the conventional technique.
Figure 5:
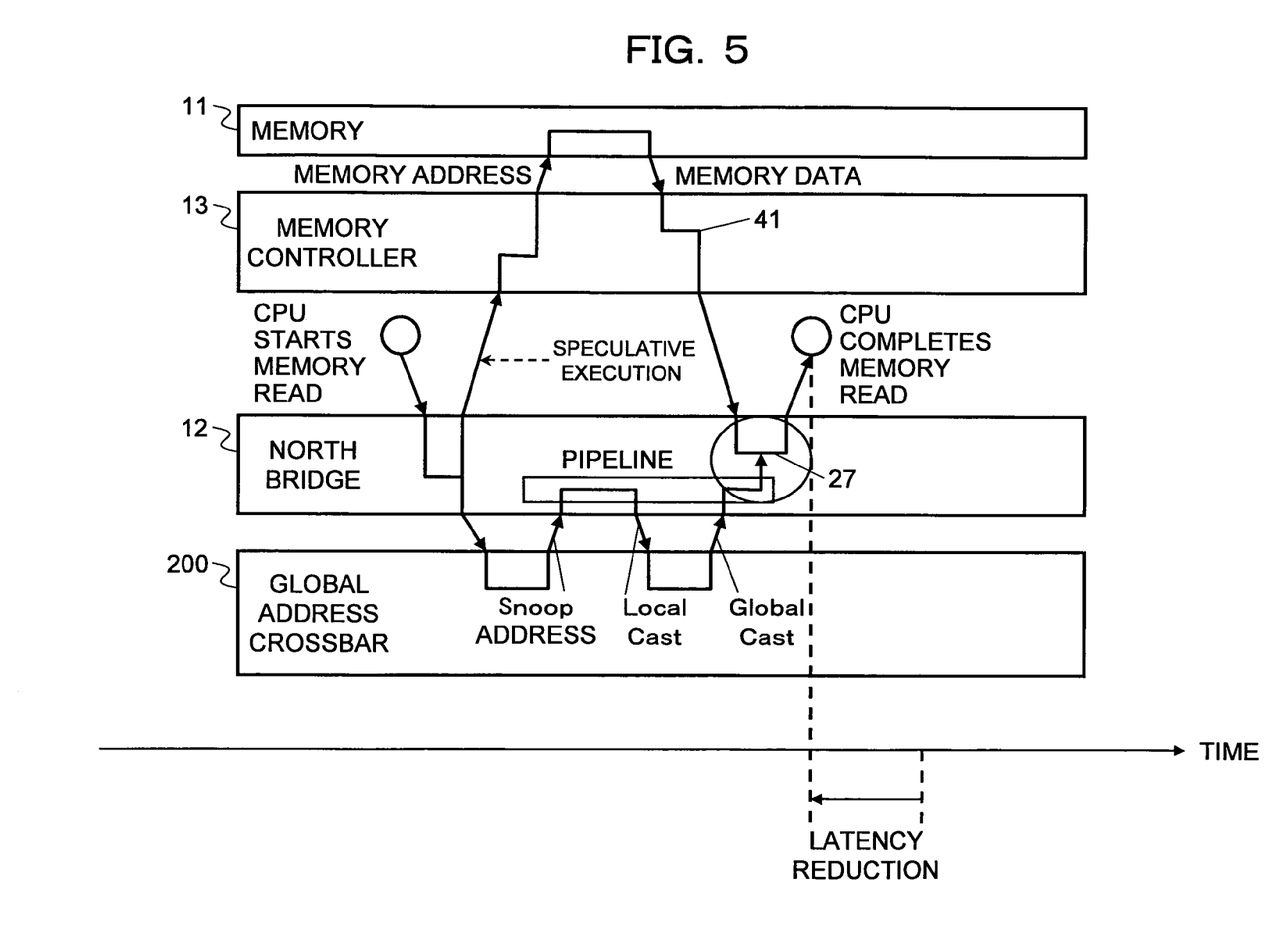
FIG. 5 is a sequence chart of the memory read processing executed according to the embodiment of the present invention.

In the conventional multiprocessor system including the SMP, as shown in FIG. 4, a read command is speculatively executed based on a GSA packet broadcasted from the global address crossbar 200 and data is queued in the slave memory read data queue 41. On the other hand, in the multiprocessor system of the embodiment, as shown in FIG. 5, a read command is speculatively executed based on an LRA packet inputted to the global address crossbar 200 and data is queued in the master read data queue 27. Thus, it is possible to read data from the memory 11 at high speed and immediately transmit the data to the CPU 10.

Figure 6:
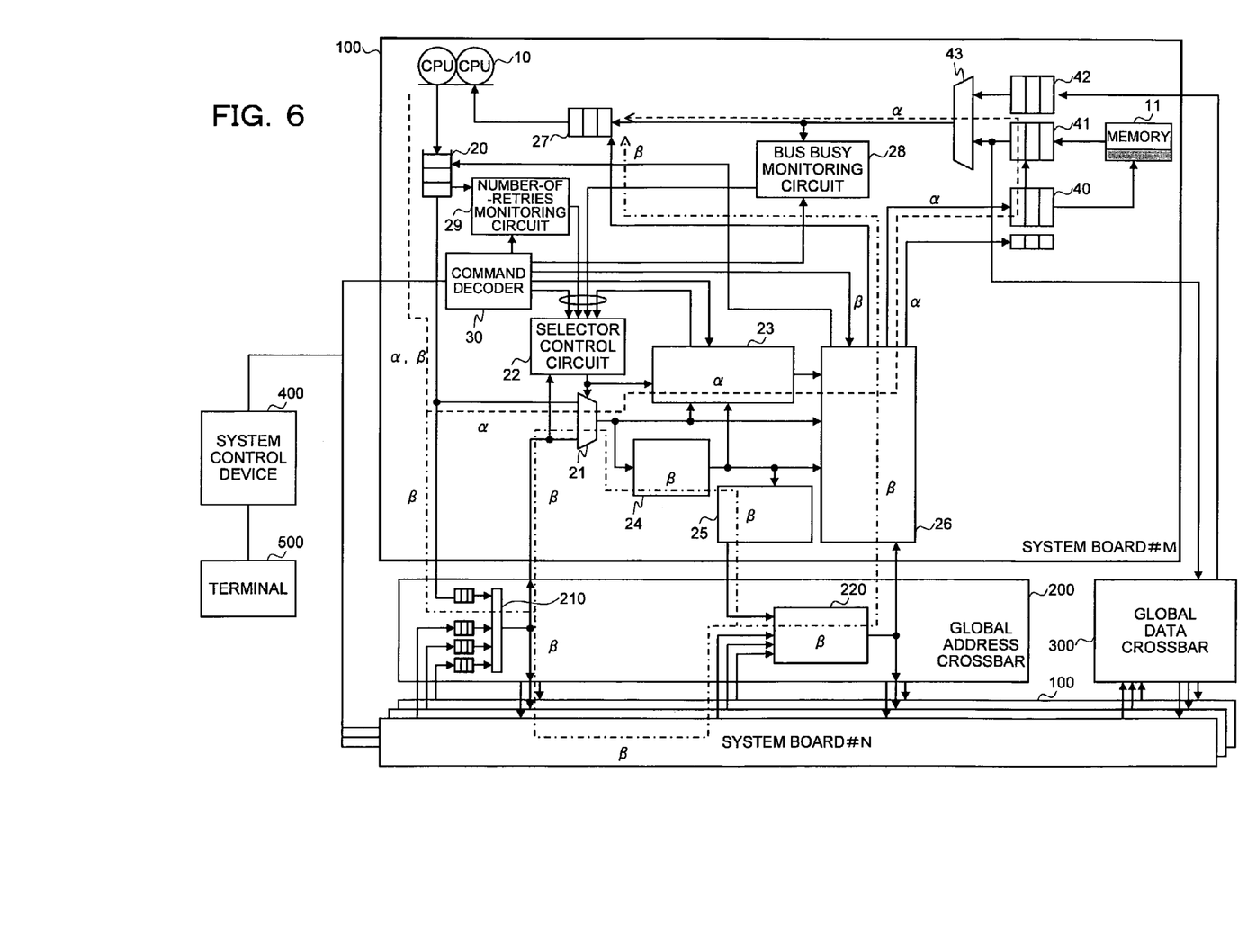
FIGS. 6 to 8 are diagrams for explaining a flow of a signal in the memory read processing executed according to the embodiment of the present invention.

A flow of a signal at the time when the memory 11 included in the own system board 100 is read is shown in FIG. 6.

As shown in the figure, in the embodiment, when the memory 11 included in the own system board 100 is read, as indicated by a (a broken line) in the figure, a read command is speculatively executed at a stage earlier than that in the past. Data read from the memory 11 is queued in the master read data queue 27. As indicated by β (an alternate long and short dash line) in the figure, adoption or non-adoption for the read command speculatively executed is determined based on an operation of the SMP. The master read data queue 27 performs processing to reflect a result of the determination.

Figure 7:
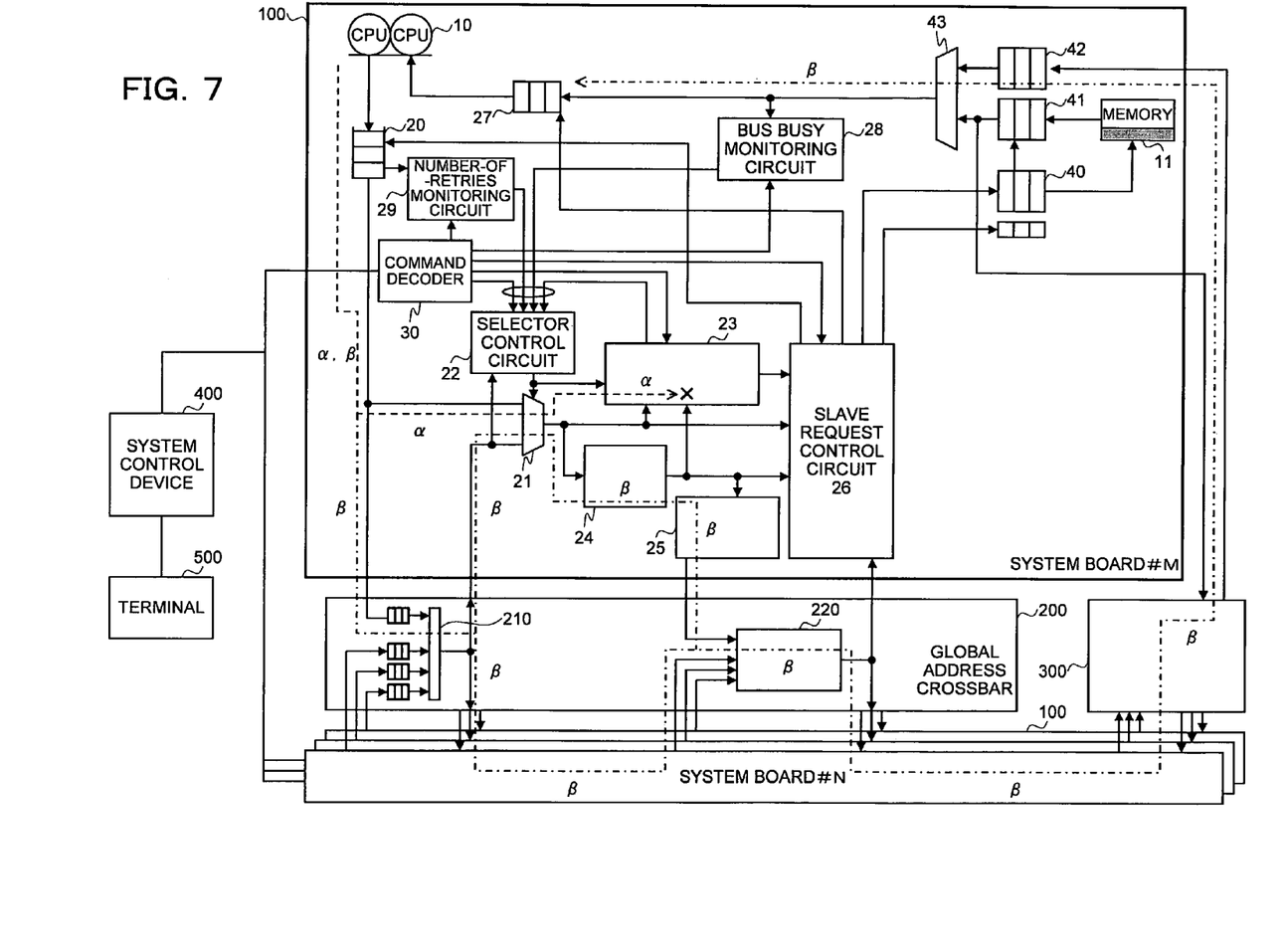

A flow of a signal at the time when the memory 11 included in another system board 100 is read is shown in FIG. 7.

In this case, since the memory 11 included in the own system board 100 is not read, a read command is not speculatively executed at an early stage characteristic in the embodiment as indicated by a (an alternate long and short dash line) in the figure and data is transferred from another system board 100 based on an operation of the SMP as indicated by β (an alternate long and short dash line) in the figure. Thus, the system board 100 performs processing to receive the data.

Figure 8:
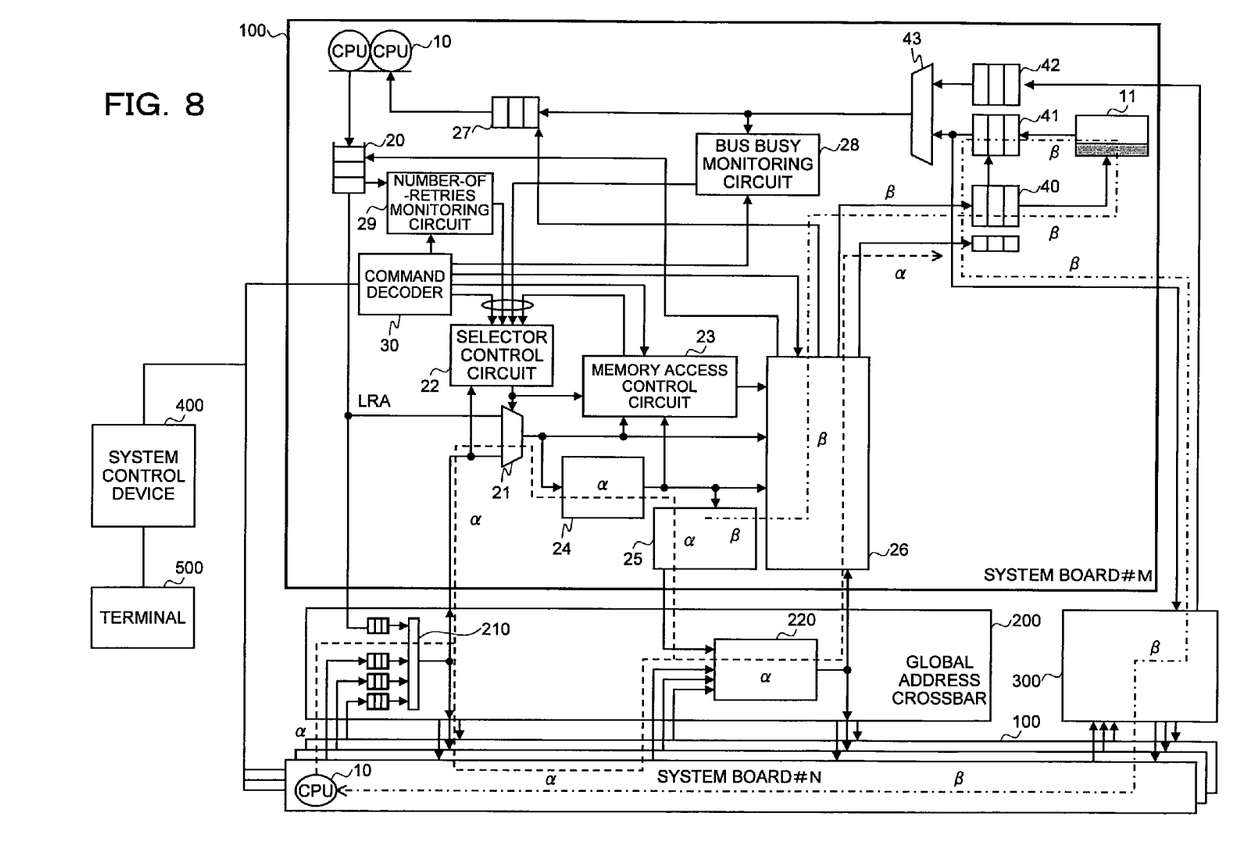

A flow of a signal at the time when the CPU 10 included in another system board 100 reads the memory 11 included in the own system board 100 is shown in FIG. 8.

In this case, since the CPU 10 included in the own system board 100 does not issue a read command, as indicated by α and β (α: broken line, β: alternate long and short dash line) in the figure, speculative execution of the read command is performed according to a GSA packet based on an operation of the SMP. As indicated by a in the figure, adoption or non-adoption for the read command speculatively executed is determined based on an operation of the SMP. When it is determined that the read command is adopted, processing of data read from the memory 11 is performed to transfer data to the CPU 10 included in the system board 100 at a read command issue source.

As explained above, in the multiprocessor system of the embodiment, a read command is speculatively executed at a stage earlier than that in the past. Therefore, it is likely that the number of times of retry of the read command increases.

Thus, in the multiprocessor system of the embodiment, the memory access control circuit 23 detects a frequency of retry. When the memory access control circuit 23 detects frequent retry because of frequent retry instructions from the global address crossbar 200, the memory access control circuit 23 controls the selector 21 to forcibly select a GSA packet for a fixed period. Consequently, the memory access control circuit 23 controls speculative execution of a read command based on an LRA packet that is processing characteristic of the embodiment.

In the multiprocessor system of the embodiment, data read from the memory 11 is transferred to the master read data queue 27 and queued therein rather than being queued in the slave memory read data queue 41.

When above described structure is adopted, the bus connecting the slave memory read data queue 41 and the master read data queue 27 comes into a busy state.

Thus, in the multiprocessor system of the embodiment, the bus busy monitoring circuit 28 is provided. The bus busy monitoring circuit 28 counts the number of data packets transferred to the bus in a fixed period to judge whether the bus comes into the busy state. When the bus busy monitoring circuit 28 detects that the bus comes into a bus busy state, the bus busy monitoring circuit 28 controls the selector 21 to forcibly select a GSA packet in a fixed period to control speculative execution of a read command based on an LRA packet that is processing characteristic of the embodiment.

In the multiprocessor system of the embodiment, a read command is speculatively executed at a stage earlier than that in the past. Therefore, it is likely that the number of times of retry for a specific read command increases.

Thus, in the multiprocessor system of the embodiment, the number-of-retries monitoring circuit 29 is provided. For an LRA packet for which retry is repeated the number of times equal to or larger than a specified number of times, the number-of-retries monitoring circuit 29 controls the selector 21 to forcibly select a GSA packet in a fixed period to control speculative execution of a read command based on the LRA packet that is processing characteristic of the embodiment.

The present invention is explained according to the embodiment shown in the figures. However, the present invention is not limited to the embodiment.

For example, in the embodiment, speculative execution of a read command based on an LRA packet is performed without considering a type of the read command. However, speculative execution of a read command based on an LRA packet may be performed with a read command having a high probability of presence of data of a read request in the memory 11 as a processing object.

Data in the memory 11 may be brought into the cache of the CPU 10 and rewritten. Speculative execution of a read command with such data as read request data eventually results in failure.

Thus, for example, for a read command for requesting acquisition of an exclusive right, since data is highly likely to be rewritten, such a read command (which is judged according to an operation code) does not have to be a processing object of the present invention.

In the embodiment, when the bus busy monitoring circuit 28 detects a busy state of the bus connecting the slave memory read data queue 41 and the master read data queue 27, the bus busy monitoring circuit 28 controls the selector 21 to forcibly select a GSA packet in a fixed period. However, when the bus busy state is detected, a notification destination of adoption or non-adoption of speculative execution may be changed from the master read data queue 27 to the slave memory read data queue 41 to queue data read from the memory 11 in the slave memory read data queue 41 rather than queuing the data in the master read data queue 27.

What is claimed is:

1. A multiprocessor system comprising:
   a global address crossbar;
   a plurality of system boards connected with each other via the global address crossbar, each of which has a CPU, a memory, a data queue provided on the CPU, and a data queue provided on the memory, wherein processing is symmetrically assigned to all the CPUs by inputting addresses to the global address crossbar;
   a judging unit judging whether a read command issued from a CPU is a read command to a memory on an own system board, the read command being to be inputted to the global address crossbar;
   an executing unit speculatively executing, in a case that the judging unit judges that the read command is a read command to the memory on the own system board, the read command before global access based on an address notified from the global address crossbar;
   a setting unit setting, when the read command is speculatively executed, for queuing data read from the memory by the read command speculatively executed in the data queue provided on the CPU without queuing the data in the data queue provided on the memory; and
   an instructing unit instructing, based on the notification from the global address crossbar, the data queue provided on the CPU to discard the data or transmit the data to the CPU.

2. The multiprocessor system according to claim 1, wherein, in a case that the executing unit speculatively executes the read command, the setting unit sets for queuing data read from the memory in the data queue provided on the CPU.

3. The multiprocessor system according to claim 1, further comprising:
a temporary stop unit temporarily stopping the speculative execution of the read command executed by the executing unit in a case that a bus connecting the data queue provided on the memory and the data queue provided on the CPU is in a busy state.

4. The multiprocessor system according to claim 1, further comprising:
a canceling unit temporarily canceling the setting by the setting unit to perform setting for queuing the data read from the memory in the data queue provided on the memory in a case that the bus connecting the data queue provided on the memory and the data queue provided on the CPU is in a busy state.

5. The multiprocessor system according to claim 1, further comprising:
a temporary stop unit temporarily stopping, in a case that retry for speculative execution of a read command is frequently performed, the speculative execution of the read command.

6. The multiprocessor system according to claim 1, further comprising:
a stopping unit stopping, in a case that number of retries for speculative execution of a read command exceeds the specified number of times, the speculative execution of the read command.

7. The multiprocessor system according to claim 1, wherein the judging unit judges, with a specific read command as a judgment object, whether a read command issued from the CPU is a read command to the memory on the own system board.

8. The multiprocessor system according to claim 7, wherein the judging unit uses a read command with a high probability of presence of a requested data in the memory as the specific read command.

9. A multiprocessor system having a plurality of system boards connected with each other via a global address crossbar and including a CPU and a memory in each of the plurality of system boards, and symmetrically assigning processing to all the CPUs by inputting addresses to the global address crossbar, the system comprising:
a judging unit judging whether a read command issued from a CPU is a read command to a memory on an own system board, the read command being to be inputted to the global address crossbar;
an executing unit speculatively executing, in a case that the judging unit judges that the read command is a read command to the memory on the own system board, the read command before global access based on an address notified from the global address crossbar;
a setting unit setting for queuing data read from the memory in a data queue provided on the CPU without queuing the data in a data queue provided on the memory; and
an instructing unit instructing, based on the notification from the global address crossbar, the data queue provided on the CPU to discard the data or transmit the data to the CPU, further comprising:
a temporary stop unit temporarily stopping the speculative execution of the read command executed by the executing unit in a case that a bus connecting the data queue provided on the memory and the data queue provided on the CPU is in a busy state.

10. A multiprocessor system having a plurality of system boards connected with each other via a global address crossbar and including a CPU and a memory in each of the plurality of system boards, and symmetrically assigning processing to all the CPUs by inputting addresses to the global address crossbar, the system comprising:
a judging unit judging whether a read command issued from a CPU is a read command to a memory on an own system board, the read command being to be inputted to the global address crossbar;
an executing unit speculatively executing, in a case that the judging unit judges that the read command is a read command to the memory on the own system board, the read command before global access based on an address notified from the global address crossbar;
a setting unit setting for queuing data read from the memory in a data queue provided on the CPU without queuing the data in a data queue provided on the memory; and
an instructing unit instructing, based on the notification from the global address crossbar, the data queue provided on the CPU to discard the data or transmit the data to the CPU, further comprising:
a canceling unit temporarily canceling the setting by the setting unit to perform setting for queuing the data read from the memory in the data queue provided on the memory in a case that the bus connecting the data queue provided on the memory and the data queue provided on the CPU is in a busy state.

* * * * *